United States Patent
Kamenoue et al.

(10) Patent No.: US 7,614,915 B2
(45) Date of Patent: Nov. 10, 2009

(54) WIRE HARNESS WATER CUT-OFF STRUCTURE

(75) Inventors: Masayoshi Kamenoue, Hiroshima (JP); Tomoyasu Murakami, Hiroshima (JP); Hidetaka Shishido, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/774,130

(22) Filed: Jul. 6, 2007

(65) Prior Publication Data

US 2008/0009175 A1   Jan. 10, 2008

(30) Foreign Application Priority Data

Jul. 6, 2006  (JP) ............................ P2006-186704
Jul. 6, 2006  (JP) ............................ P2006-186705

(51) Int. Cl.
*H01R 9/11* (2006.01)

(52) U.S. Cl. ...................................... 439/623

(58) Field of Classification Search .............. 174/72 A, 174/72 R, 135, 71 R; 439/623–624
See application file for complete search history.

(56) References Cited

U.S. PATENT DOCUMENTS 6,312,046 B1    11/2001  Sora et al.
7,053,305 B2 *   5/2006  Takase et al. ............. 174/72 A
2005/0150678 A1 *  7/2005  Takase et al. ............. 174/72 A
2006/0241748 A1 * 10/2006  Lee et al. .................. 623/2.37

FOREIGN PATENT DOCUMENTS

| DE | 199 59 429 A1 | 6/2000 |
| JP | 7-163033 A | 6/1995 |
| JP | 2000-203355 A | 7/2000 |
| JP | 2000-311534 A | 11/2000 |
| JP | 2002-058140 A | 2/2002 |
| JP | 2005-080489 A | 3/2005 |

OTHER PUBLICATIONS

Chinese Patent Office Action dated Jan. 23, 2009 for Chinese Patent Application No. 2007101228655.

* cited by examiner

*Primary Examiner*—Jean F Duverne
(74) *Attorney, Agent, or Firm*—Sughrue Mion, PLLC

(57) ABSTRACT

A main body portion of a grommet is mounted to a through hole of a dash panel partitioning an engine room and a vehicle compartment, a long tube is continuously provided to the main body portion, and the tube is arranged at inside of the engine room. A wire harness is inserted to the main body portion and an inner portion of the tube in an unbundled state, under the state, at least two stages of narrowed portions (first, second fixing portions) constituted by narrowing an inner diameter of the tube at a position proximate to a front end of the tube and a position proximate to the main body portion remote from the position. At the narrowed portion, by fastening a strap for fixing to an outer periphery of the tube, the inner diameter of the tube is narrowed. Wires are scattered by providing a bent portion at the wire harness coming out from the grommet.

9 Claims, 5 Drawing Sheets

WIRE HARNESS WATER CUT-OFF STRUCTURE

BACKGROUND OF THE INVENTION

1. Field of the Invention

The present invention relates to a wire harness water cut-off structure for preventing water from invading by way of clearances among wires of the wire harness from a side of an engine room to a side of a vehicle compartment when, for example, the wire harness is wired from the side of the engine room to the side of the vehicle compartment by passing the through hole of a dash panel of an automobile.

2. Related Art

In a background art, when a wire harness is wired between to a side of an engine room and a side of a vehicle compartment by way of a through hole of a dash panel, invasion of water by way of a clearance between the wire harness and the through hole is prevented by arranging a grommet between the wire harness and the through hole.

However, by simply mounting the grommet with an object of sealing the clearance between an outer periphery of the wire harness and the panel through hole, in a case in which when inside of the engine room is cleaned by high pressure water, water is brought to clearances of wires of the wire harness at inside of the engine room, it cannot be prevented that the water invades the vehicle compartment side by way of the clearances among the wires.

Hence, a grommet 20 as shown by FIG. 7 is used. The grommet 20 comprises a main body portion 21 including a main body portion 21 and a cylindrical cone portion 21b and mounted through a through hole 31 of a panel 30 of a vehicle body, a small diameter cylindrical portion 22 continuous to a small diameter side of the cylindrical cone portion, and an inner cylinder wall 23 provided at an inner portion of the main body portion 21 and is constructed by a constitution in which in a state of passing a wire harness W through the main body portion 21 and the small diameter cylindrical portion 20, by filling to solidify a seal agent 25 at an inner portion of the inner cylinder wall 23, clearances among wires of a wire exposure portion W2 exfoliated with a tape are sealed by the seal agent 25.

Further, as a structure of achieving a water cut-off effect without filling a seal agent, there is disclosed a proposal in which an inner portion of a grommet is provided with means for scattering a plurality of wires constituting a wire harness, thereby, water is prevented from invading frontward from the scattered portion (refer to, for example, JP-A-2002-58140).

Further, among these grommets, in order to install the wire harness conveniently within the engine room, there is one in which a bellows tuba is integrated and a strap clamp is attached to a part of the tube so that the wire harness is fixed to the vehicle body with the strap clamp. (See, for example, JP 2000-311534A.)

Meanwhile, the grommet 25 of a type of using the seal agent 25 as shown by FIG. 7, poses a problem that time and labor is taken for an operation of filling the seal agent 25, and therefore, it is difficult to promote a productivity.

Further, in the case of the grommet described in Patent Reference 1, the inner portion of the grommet is provided with the means for scattering a wire bundle, and therefore, the structure is complicated and cost is increased.

SUMMARY OF THE INVENTION

The invention has been carried out in view of the above-described situation and it is an object thereof to provide a wire harness water cut-off structure capable of cutting off invasion of water by a simple structure without taking time or labor.

In order to achieved the above-described object, a wire harness water cut-off structure according to the invention is characterized in (1) through (8) described below.

(1) A long tube is continuously provided to a main body portion of a grommet mounted to a through hole of a panel of a vehicle body, a wire harness is inserted to the main body portion and an inner portion of the tube in an unbundled state, wider the state, at least two stages of narrowed portions constituted by narrowing an inner diameter of the tube are provided at a position at a vicinity of a front end of the tube and a position proximate to the main body portion remote from the position.

(2) in the wire harness water cut-off structure having a constitution of (1) mentioned above, at least one of the at least two stages of narrowed portions narrows the inner diameter of the tube by projecting a rib at an inner periphery of the tube.

(3) In the wire harness water cut-off structure having the constitution of (1) mentioned above, at least one of the at least two stages of narrowed portions narrows the inner diameter of the tube by fastening a strap to an outer periphery of the tube.

(4) In the wire harness water cut-off structure having a constitution of any of (1) through (3) mentioned above the front end of the tube is directed to a lower side and arranged at a position lower than a height of the main body portion.

(5) in the wire harness water cut-off structure of a constitution of any of (1) through (4) mentioned above, by providing a bent portion at the wire harness from the narrowed portion provided at the position proximate to the main body portion to a side of the main body portion in the at least two stages of narrowed portions, a plurality of wires constituting the wire harness are scattered between the narrowed portion and the bent portion.

(6) In the wire harness water cut-off structure having a constitution of (5), the bent portion scattering the plurality of wires is formed at a vicinity of a position at which the wire harness comes out from the main body portion of the grommet by providing a portion of the wire harness fixed to the vehicle body at a vicinity of the position at which the wire harness comes out from the main body portion of the grommet.

(7) In the wire, harness water cut-off structure having a constitution of (6), the panel of the vehicle body is a dash panel partitioning an engine room and a vehicle compartment of an automobile, in a state of arranging the tube to a side of the engine room, the main body portion of the grommet is fitted to be attached to a through hole of the dash panel, and the portion of the wire harness fixed to the vehicle body is provided at a vicinity of the through hole of the dash panel to thereby arrange the bent portion to an inner side of the vehicle chamber.

(8) In the wire harness water cut-off structure having the constitution of (3), the tube and the wire harness are fixed to the vehicle body by locking the strap by the vehicle body.

According to the wire harness water cut-off structure having the constitution of (1), the long tube is continuously provided to the main body portion of the grommet, and therefore, water can be made to be difficult to enter an inner portion of the grommet. Further, after inserting the wire harness to the grommet, the inner diameter of the tube is narrowed at least two portions, and therefore, even when attacked by high pressure cleaning water, power of invasion of water can be weakened, invasion of water to a depth side can be held back. Further, the wire harness passed into the tube is brought into an unbundled state, and therefore, even when water accidentally invades inside of the tube, invasion of water by a capillary phenomenon can be restrained as less as possible by a degree of scattering wires. Further, according to the structure, a water cut-off effect can be achieved without taking time and labor since a water cut-off agent is not used, the long tube is provided continuously thereto, and only the inner diameter of the tube is narrowed at a pertinent portion, and therefore, the constitution is simple and can be realized at low cost.

According to the wire harness water cut-off structure having the constitution of (2), by projecting the rib at the inner periphery of the tube, the inner diameter of the tube is narrowed, and therefore, a water cut-off effect by narrowing the inner diameter can be achieved by only passing the wire harness through inside of the tube.

According to the wire harness water cut-off structure having the constitution of (3), the inner diameter of the tube is narrowed by fastening the strap to the outer periphery of the tube, and therefore, the water cut-off effect by narrowing the inner diameter can be achieved by only fastening the strap after passing the wire harness into the tube.

According to the wire harness water cut-off structure having the constitution of (4), by directing the front end of the tube to the lower side and making the front end of the tube lower than the height of the main body portion, invasion of water from the front end of the tube can further be held back.

According to the wire harness water cut-off structure having the constitution of (5), by providing the bent portion at the wire harness from the narrowed portion proximate to the main body portion to the side of the main body portion, a plurality of wires constituting the wire harness are scattered between the narrowed portion and the bent portion, and therefore, even when water accidentally invades by exceeding the narrowed portion, since the wires are firmly scattered between the bent portion and the narrowed portion, further invasion of water by the capillary phenomenon can be stopped.

According to the wire harness water cut-off structure having the constitution of (6), the bent portion for scattering the wires is formed at the vicinity of the position at which the wire harness comes out from the main body portion of the grommet, and therefore, the wires can firmly be scattered by considerably bending the wire harness, and invasion of water by the capillary phenomenon can be held back by enlarging the clearances among the wires.

According to the wire harness water cut-off structure having the constitution of (7), the wire harness is wired between the side of the engine room and the side of the vehicle chamber, by passing the wire harness through the grommet in the state in which the grommet is mounted to the through hole of the dash panel partitioning the engine room and the vehicle chamber, the tube of the grommet is arranged on the side of the engine room, and therefore, a problem of invasion of water to the inner side of the vehicle cheer in a case of cleaning inside of the engine room by high pressure water can be effectively resolved without taking time and labor.

According to the wire harness water cut-off structure having the constitution of (8), the tube and the wire harness are fixed to the vehicle body by locking the strap by the vehicle body, and therefore, the water cut-off effect by narrowing the inner diameter of the tube can be achieved by only fastening the strap for fixing the wire harness.

According to the invention, the wire harness water cut-off structure capable of cutting off invasion of water can be provided by a simpler structure and without taking time and labor.

As described above, the invention has been concisely explained. Further, details of the invention will become further clear by reading the best mode for carrying out the invention explained below in reference to the attached drawings.

DETAILED DESCRIPTION OF THE PREFERRED EMBODIMENTS

Preferable embodiments according to the invention will be explained in details in reference to the drawings as follows.

Figure 1:
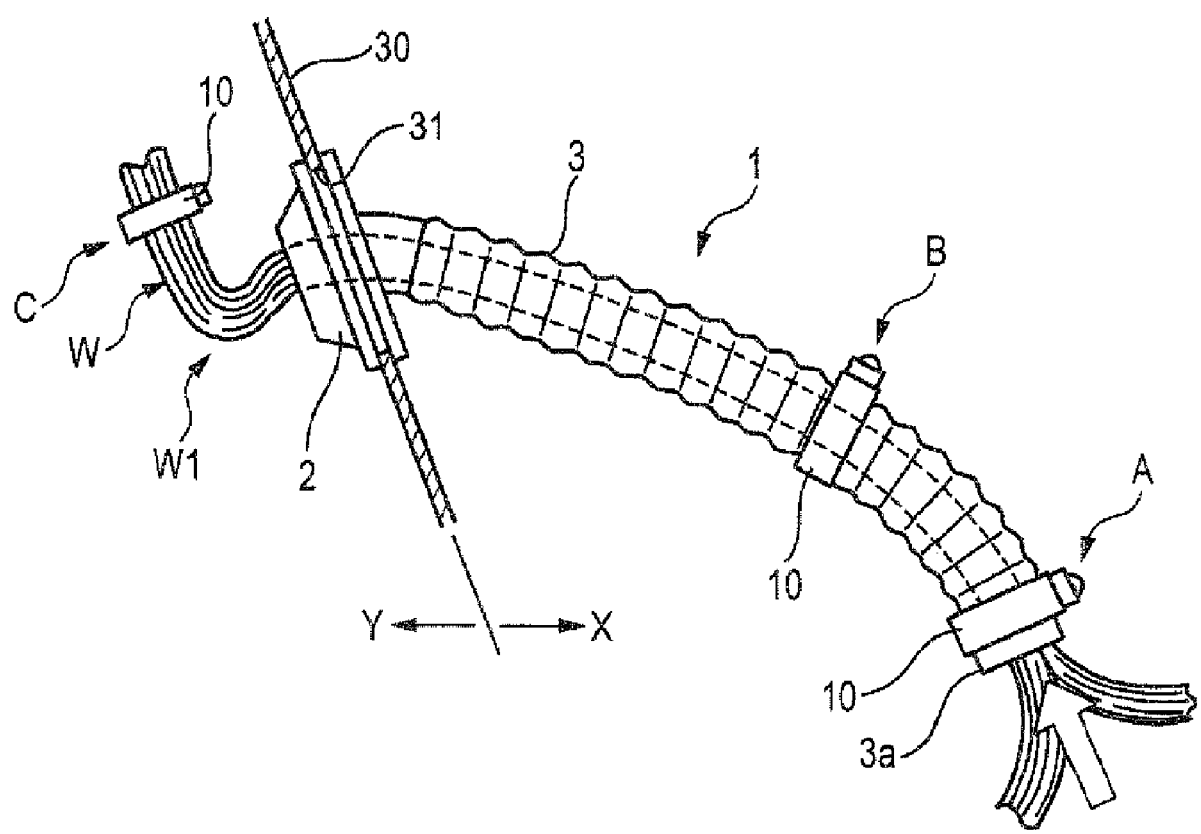
FIG. 1 is a side view of a wire harness water cut-off structure according to a first embodiment of the invention.

FIG. 1 is a side view of a wire harness water cut-off structure according to a first embodiment of the invention.

The water cut-off structure of the first embodiment is applied to a case of wiring a wire harness W by way of a through hole 31 of a dash panel 30 partitioning an engine room X and a vehicle compartment Y. A grommet 1 used here includes a main body portion 2 mounted to the through hole 31 of the dash panel 31 and a long tube 3 continuously provided to the main body portion 2. A principal length portion of the tube 3 is provided with a flexibility by thin-walling a peripheral wall thereof and forming the portion by a shape of a bellows.

The grommet 1 is fixed to the dash panel 30 in a state of arranging a side of extending the tube 3 at inside of the engine room X by fitting to attach the main body portion 2 to the through hole 31 of the dash panel 30. Further, since integrally provided with the long tube 3, the wire harness W at inside of the tube 3 is fixed to the vehicle body along with the tube 3 by attaching a strap 10 at a pertinent position of the wire harness W covered by the tube 3 and locking the strap by the vehicle body. Portions thereof fixed by the straps 10 are provided at two portions of a first fixing portion A at a vicinity of a front end 3a of the tube 3 and a second fixing portion B proximate to the main body portion 2 remote from the position. The front end 3a of the tube 3 is directed to a lower side and is arranged at a position lower than a height of the main body portion 2.

In this case, at the first, the second fixing portions A, B, an inner diameter of the tube 3 is narrowed by strongly fastening the strap 10 from an outer periphery of the tube 3, and the portions respectively constitute narrowed portions narrowing the inner diameter of the tube 3.

Figure 2:
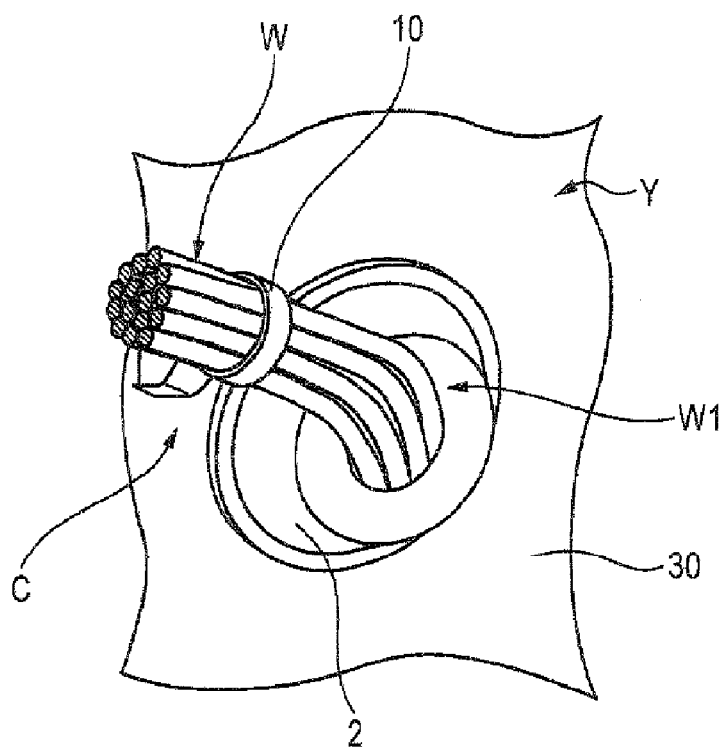
FIG. 2 is a perspective view showing a state in which a third fixing portion for fixing a wire harness to a vehicle body is provided at a vicinity of a position at which the wire harness comes out from a main body portion of a grommet into a vehicle chamber, thereby, a bent portion is formed at the wire harness coming out from the grommet.

Further, as shown by FIG. 1 and FIG. 2, the wire harness W is inserted to an inner portion of the grommet 1 in an unbundled state, and a bent portion W1 is formed at the wire harness W coming out from the grommet 1 by providing a third fixing portion C for fixing the wire harness W to the dash panel 30 at a vicinity of a position at which the wire harness W comes out from the main body portion 2 from the grommet 1 to inside of the vehicle chamber W. At the bent portion W1, by bending the wire harness W in the unbundled state by a small radius of curvature, a plurality of wires are naturally scattered and clearances among the wires of the portion are enlarged.

According to the water cut-off structure having the above-described constitution, the long tube 3 is continuously provided to the main body portion 2 of the grommet 1, and therefore, water can be made to be difficult to enter an inner portion of the grommet 1. Further, the wire harness W is inserted through the grommet 1, thereafter, the inner diameter of the tube 3 is narrowed at two portions (first, second fixing portions A, B), and therefore, even when attached by high pressure cleaning water, power of invasion of water can be weakened and invasion of water to a depth side can be held back. It is naturally further preferable that the narrowed portion (fixing portion) of narrowing the inner diameter of the tube 3 in this way is further provided other than the first, the second fixing portions A, B to provide the narrowed portions at 3 or more portions.

Further, the wire harness W passing through inside of the tube 3 is brought into the unbundled state, and therefore, even when water accidentally invades inside of the tube 3, invasion of water by a capillary phenomenon can be restrained as less as possible by a degree of scattering the wires.

Further, the front end 3a of the tube 3 is directed to the lower side, the front end 3a of the tube 3 is arranged to be lower than the height of the main body portion 2, and therefore, invasion of water from the front end of the tube can further be held back.

Further, by providing the bent portion W1 at the wire harness W from the second fixing portion B proximate to the main body portion 2 to the side of the main body portion 2, a plurality of wires constituting the wire harness W are scattered between the bent portion W1 and the second fixing portion B, and therefore, even when water invades accidentally by exceeding the second fixing portion B, the wires are firmly scattered between the bent portion W1 and the second fixing portion B, and therefore, further invasion of water by the capillary phenomenon can be stopped. Further, so far as the clearances among the wires of the wire harness W can be ensured to a degree of not hampering a function of stopping invasion of water by the capillary phenomenon, the portion of the wire harness W at a vicinity of the bent portion W1 may be fixed to the main body portion 2 of the grommet 2 by an adhering tape or the like.

Further, according to the first embodiment, the inner diameter of the tube 3 is narrowed by fastening the strap 10 for fixing to the outer periphery of the tube 3, and therefore, water cut-off effect by narrowing the inner diameter can be achieved by only fastening the strap 10 for fixing after passing the wire harness W into the tube 3.

Further, according to the structure, the water cut-off effect can be achieved without taking time and labor since the water cut-off agent is not used, the long tube 3 is continuously provided, and the inner diameter of the tube 3 is only narrowed at the pertinent portion, and therefore, the constitution is simple and can be realized at low cost.

Second Embodiment

Figure 4A:
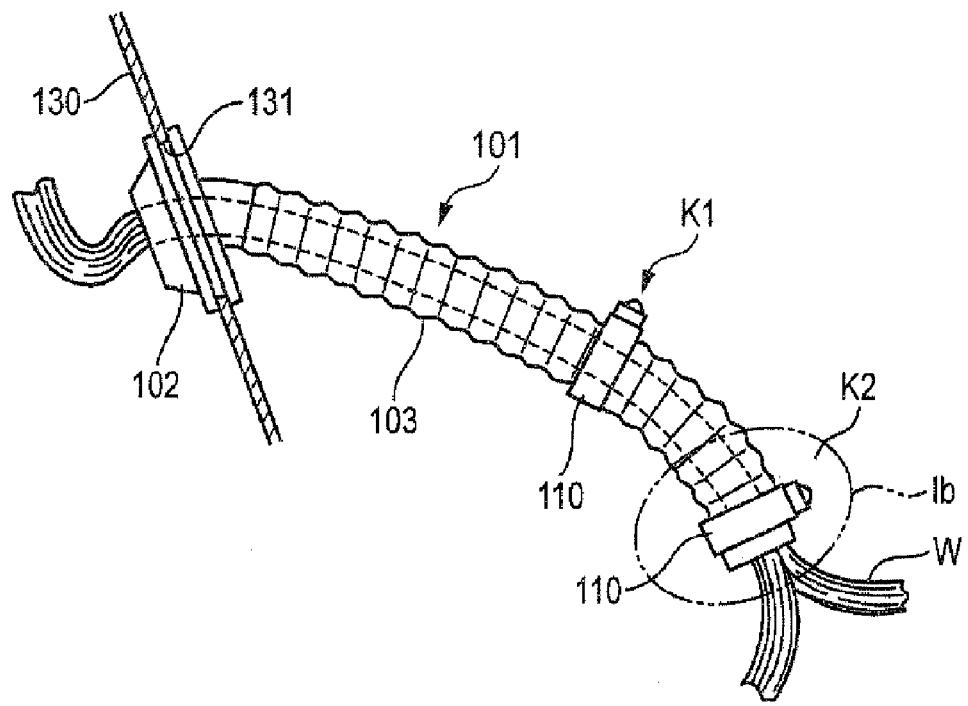
FIG. 4A is a side view showing a state of attaching a grommet according to an embodiment of the invention.
Figure 4B:
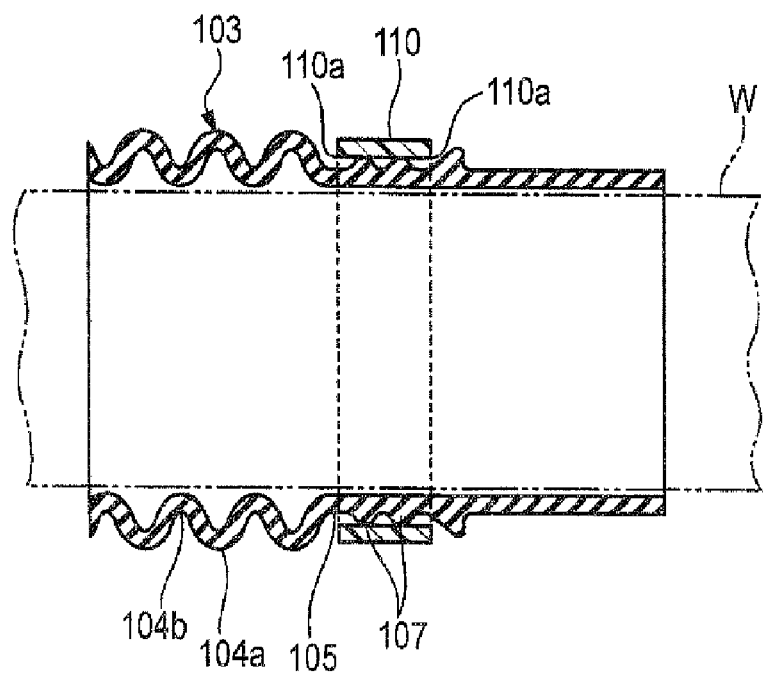
FIG. 4B is a sectional view enlarging Ib portion of FIG. 4B.
Figure 5:
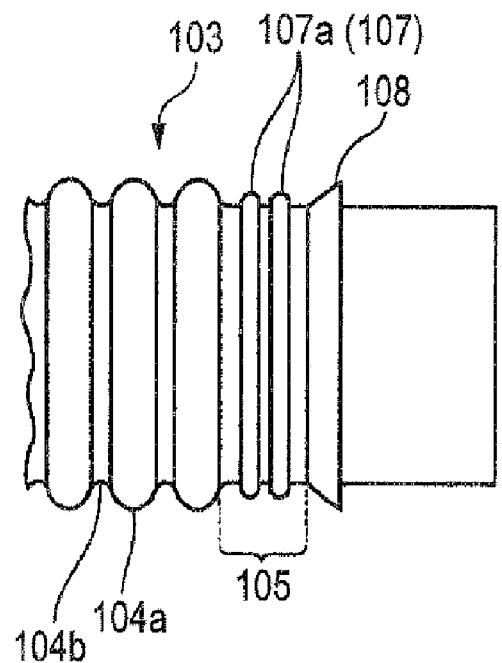
FIG. 5 is an outlook view showing a portion of a tube of the grommet.
Figure 6:
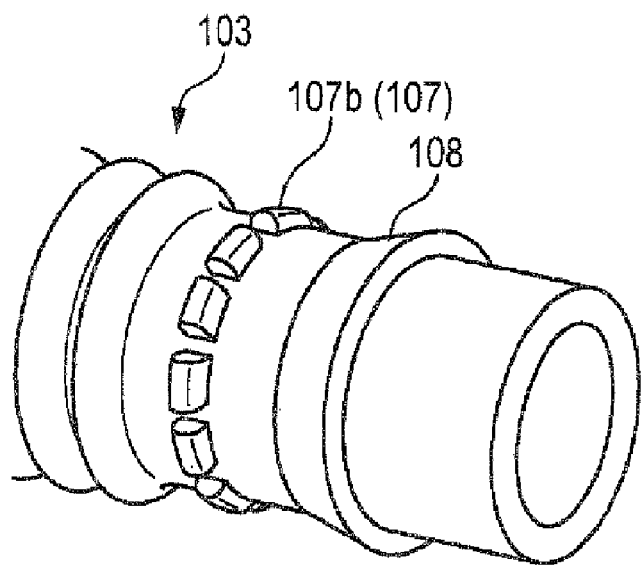
FIG. 6 is a perspective view showing a modified example of the portion of the tube.
Figure 7:
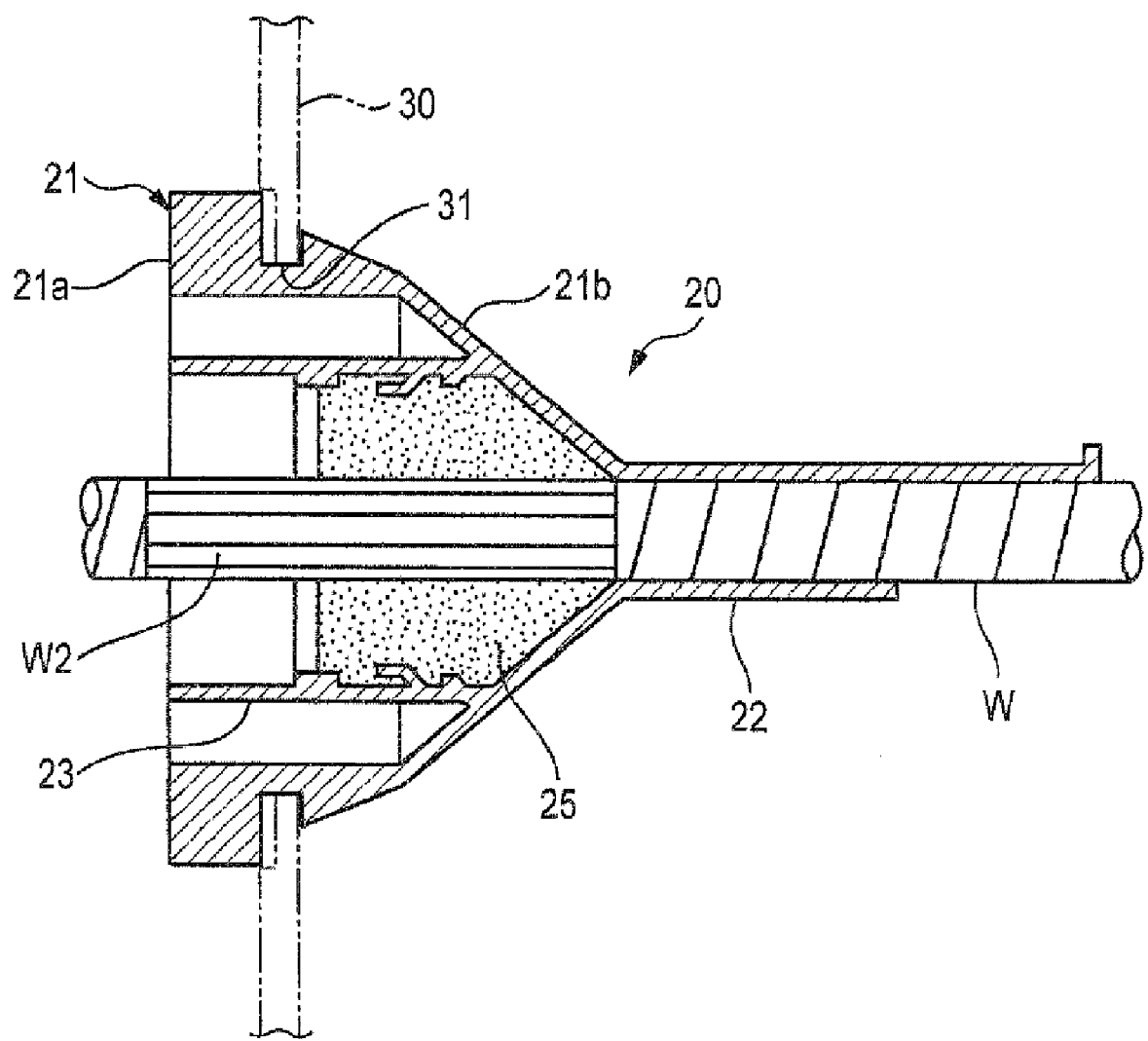
FIG. 7 is a sectional view showing an example of a wire harness cut-off structure of a background art.

FIG. 4A is a side view showing a state of attaching a grommet according to a second embodiment, FIG. 4B is a sectional view enlarging Ib portion of FIG. 4A, FIG. 5 is an outlook view showing a portion of a tube of FIG. 4B, FIG. 6 is a perspective view showing a modified example of the portion of the tube of FIG. 5.

A grommet 101 of the second embodiment includes a grommet main body portion 102 mounted to a through hole 131 of a dash panel 130, and a long tube 103 continuously provided to the grommet main body portion 102. A principal length portion of the tube 103 is provided with a flexibility by thin-walling a peripheral wall thereof and being formed in a shape of a bellows.

The grommet 101 is fixed to the dash panel 130 by fitting to attach the grommet main body portion 102 to the through hole 131 of the dash panel 130 in a state of penetrating a wire bundle W at an inner portion thereof. Further, the grommet 101 is integrally provided with the long tube 103, and therefore, the wire bundle W at inside of the tube 103 can be fixed to a vehicle body along with the tube 103 by attaching a strap 110 at a pertinent position of the tube 103. Fixing portions by the straps 110 are provided at two portions of a first fixing portion K1 and a second fixing portion K2.

The tube 103 the principal length portion of which is formed in the shape of the bellows is provided with a straight strap winding portion 105 which is not provided with a mountain portion 104a and a valley portion 104b as in the bellows portion, and on an outer peripheral face of the strap winding portion 105, there is provided a projected portion 107 in an annular shape (further specifically, ring-like shape) for floating up both end edges 110a in a width direction of the strap 110 from an outer peripheral face of the tube 103 (further in details, an outer peripheral face of the strap winding portion 105).

In all example of FIG. 4A, FIG. 4B and FIG. 5, a plurality of (2 pieces in the example of FIG. 4A, FIG. 4B and FIG. 5) of the projected portions 107 in the annular shape are provided at an interval therebetween in an axis line direction of the tube 103. The projected portions 107 in the annular shape in this case may be formed as a projected portion 107a over an entire periphery thereof as shown by FIG. 5, or may be formed as an alignment of a number of projected portion 107b aligned at intervals in a peripheral direction.

Further, in a side direction of the projected portion 107 in the annular shape at the outer peripheral face of the tube 103 is provided with a rib 108 having an outer diameter larger than an outer diameter of the projected portion 107 in the annular shape for preventing the strap 110 from moving by a predetermined amount or more.

When the strap 110 is wound to fix to the outer periphery of the tube 103 of the grommet 101, as shown by FIG. 4B, by winding to fasten the strap 110 above a top portion of the projected portion 107 in the annular shape along the projected portion 107 in the annular shape, the both end edges 110a in a width direction of the strap 110 are held in a state of being floated up from the outer periphery of the tube 103.

When the both end edges 10a in the width direction of the strap 110 are fastened in the state of being floated up from the outer peripheral face of the tube 103 in this way, the both end edges 110a of the strap 110 can be prevented from strongly interfering with the outer peripheral face of the tube 103. Therefore, the outer peripheral face of the tube 103 can be prevented from being damaged or a crack is generated at the outer peripheral face as less as possible.

Further, when the projected portion 107 in the annular shape is provided at the position of winding the strap 103, there is also achieved an advantage that the position of winding the strap 110 is made to be easy to be confirmed by optical observation.

Further, although depending on a state of use, there is a case in which a position of the strap 110 is shifted, since the rib 108 having the diameter larger than the outer diameter of the projected portion 107 in the annular shape is provided in the side direction of the projected portion 107 in the annular shape, the strap can always be held at a correct winding position.

Further, the invention is not limited to the above-described embodiment but can pertinently be modified, improved or the like. Further, materials, shapes, dimensions, numbers, arranging portions of respective constituent elements in the embodiment are arbitrary and not limited so far as the invention can be achieved.

Further, the invention is not limited to the above-described embodiments but can pertinently be modified, improved or the like. Further, materials, shapes, dimensions, numbers, arranging portions and the like of respective constituent elements in the above-described embodiment are arbitrary and not limited so far as the invention can be achieved.

Figure 3:
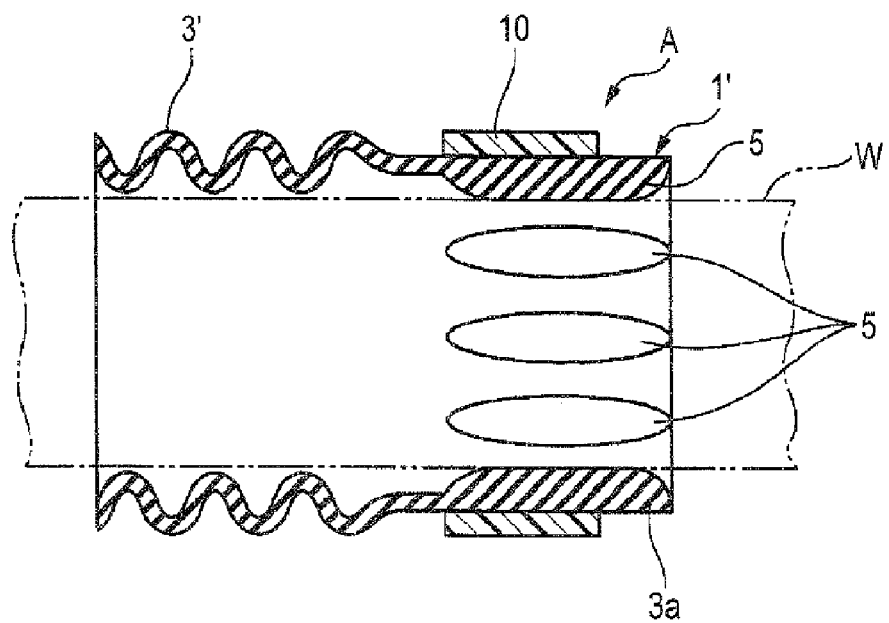
FIG. 3 is a sectional view enlarging an essential portion of a modified example of the wire harness water cut-off structure of FIG. 1.

According to the above-described first embodiment, there is shown a case of narrowing the inner diameter of the tube 3 by fastening the strap 10 for fixing to the outer periphery of the tube 3. However, as shown by FIG. 3, a grommet 1' of a mode of narrowing an inner diameter of a tube 3' may be constituted by projecting a plurality of ribs 5 on an inner peripheral face of the tube 3' (further, at least one of the rib 5 may be provided). When constituted in this way, by only passing the wire harness W into the tube 3', water cut-off effect by narrowing the inner diameter can be achieved.

Further, although according to the first embodiment, there is shown the case of using the strap 10 for fastening the outer periphery of the tube 3 in order to narrow the inner diameter of the tube 3, so far as a inner capable of narrowing the inner diameter of the tube 3 is used, a strap or an adhering tape may be used.

Further, in the second embodiment, a number of pieces, a sectional shape and the like of the projected portion 107 in the annular shape can arbitrarily be selected.

What is claimed is:

1. A wire harness water cut-off structure comprising:
   a grommet including a main body portion mounted to a through hole of a panel of a vehicle body, and a long tube continuously provided to the main body portion,
   wherein a wire harness is inserted to the main body portion and an inner portion of the tube in an unbundled state,
   in the unbundled state, at least two stages of narrowed portions constituted by narrowing an inner diameter of the tube are provided at a first position at a vicinity of a front end of the tube and a second position proximate to the main body portion remote from the first position; and
   a plurality of wires constituting the wire harness are scattered at a stage disposed between the at least two stages of narrowed portions.

2. The wire harness water cut-off structure according to claim 1, wherein at least one of the at least two stages of narrowed portions narrows the inner diameter of the tube by projecting a rib at an inner periphery of the tube.

3. The wire harness water cut-off structure according to claim 1, wherein at least one of the at least two stages of narrowed portions narrows the inner diameter of the tube by fastening a strap to an outer periphery of the tube.

4. The wire harness water cut-off structure according to claim 1, wherein the front end of the tube is directed to a lower side and arranged at a position lower than a height of the main body portion.

5. The wire harness water cut-off structure according to claim 1, wherein by providing a bent portion at the wire harness from the narrowed portion provided at the second position proximate to the main body portion to a side of the main body portion in the at least two stages of narrowed portions, the plurality of wires constituting the wire harness are scattered between the narrowed portion and the bent portion.

6. The wire harness water cut-off structure according to claim 5, wherein the bent portion scattering the plurality of wires is formed at a vicinity of a position at which the wire harness comes out from the main body portion of the grommet by providing a portion of the wire harness fixed to the vehicle body at a vicinity of the position at which the wire harness comes out from the main body portion of the grommet.

7. The wire harness water cut-off structure according to claim 6, wherein the panel of the vehicle body is a dash panel partitioning an engine room and a vehicle compartment of an automobile, in a state of arranging the tube to a side of the engine room, the main body portion of the grommet is fitted to be attached to a through hole of the dash panel, and the portion of the wire harness fixed to the vehicle body is provided at a vicinity of the through hole of the dash panel to thereby arrange the bent portion to an inner side of the vehicle chamber.

8. The wire harness water cut-off structure according to claim 1, wherein the plurality of wires constituting the wire harness are scattered such that gaps are formed between the wires.

9. The wire harness water cut-off structure according to claim 8, wherein the plurality of wires constituting the wire harness are not scattered at the at least two stages of narrowed portions.

\* \* \* \* \*